United States Patent
Dübal et al.

[11] Patent Number: 5,378,394
[45] Date of Patent: Jan. 3, 1995

[54] FERROELECTRIC LIQUID-CRYSTALLINE MIXTURES

[75] Inventors: Hans-Rolf Dübal, Königstein; Claus Escher, Mühltal, both of Germany; Takamasa Harada, Inzai, Japan; Wolfgang Hemmerling, Sulzbach, Germany; Gerhard Illian, Frankfurt am Main, Germany; Ingrid Müller, Niedernhausen, Germany; Mikio Murakami, Kakegawa, Japan; Dieter Ohlendorf, Liederbach, Germany; Rainer Wingen, Hattersheim am Main, Germany

[73] Assignee: Hoechst Aktiengesellschaft, Frankfurt am Main, Germany

[21] Appl. No.: 761,813

[22] PCT Filed: Mar. 21, 1990

[86] PCT No.: PCT/EP90/00457

§ 371 Date: Oct. 28, 1991

§ 102(e) Date: Oct. 28, 1991

[87] PCT Pub. No.: WO90/11335

PCT Pub. Date: Oct. 4, 1990

[30] Foreign Application Priority Data

Mar. 22, 1989 [DE] Germany .................. 3909355

[51] Int. Cl.⁶ .................. C09K 19/34; C07D 239/02
[52] U.S. Cl. .................. 252/299.61; 544/298
[58] Field of Search .................. 252/299.61; 544/298

[56] References Cited

U.S. PATENT DOCUMENTS

4,873,019  10/1989  Krause et al. ............... 252/299.61
4,876,028  10/1989  Hemmerling et al. ........ 252/299.61

*Primary Examiner*—Robert L. Stoll
*Assistant Examiner*—C. Harris
*Attorney, Agent, or Firm*—Curtis, Morris & Safford

[57] ABSTRACT

The novel ferroelectric liquid-crystalline mixtures are based on at least two mixture components of the general formula (I)

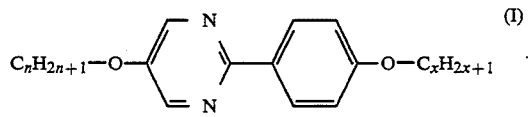

but additionally contain at least one optically active dope from one or more of the following groups
a) optically active esters of tetrahydrofuran-2-carboxylic acid
b) optically active aryl 2,3-epoxyalkyl ethers
c) optically active 1,3-dioxolan-4-yl ethers.

The ferroelectric LC mixtures have a high spontaneous polarization and facilitate substantial compensation of the pitch of the helix in a nematic phase.

9 Claims, No Drawings

FERROELECTRIC LIQUID-CRYSTALLINE MIXTURES

Ferroelectric liquid crystals have recently attracted interest as a display medium in electrooptical assemblies (for example Lagerwall et al., "Ferroelectric Liquid Crystals for Displays", SID Symposium, October Meeting 1985, San Diego, Calif. USA).

For practical use of ferroelectric liquid crystals in electrooptical displays, chiral, tilted, smectic phases, such as $S_c$ phases, are required [R. B. Meyer, L. Liébert, L. Strzelecki and P. Keller, J. Physique 36, L-69 (1975)], which are stable over a broad temperature range. This aim can be achieved by means of compounds which themselves form such phases, for example $S_c$ phases, or, however, by doping compounds which form non-chiral, tilted, smectic phases, with optically active compounds [M. Brunet, C. Williams, Ann. Phys. 3, 237 (1978)].

Furthermore, a unitary planar orientation of the liquid crystals is necessary in order to achieve a high contrast ratio when ferroelectric liquid-crystal mixtures are used in electrooptical assemblies. It has been shown that a unitary planar orientation in the $S_c$ phase can be achieved if the phase sequence of the liquid-crystal mixture with decreasing temperature is as follows:

Isotropic→nematic→smectic A→smectic C.

(for example K. Flatischler et al., Mol. Cryst. Liq. Cryst. 131, 21 (1985); T. Matsumoto et al., p. 468–470, Proc. of the 6th Int. Display Research Conf., Japan. Display, Sep. 30–Oct. 2, 1986, Tokyo, Japan; M. Murakami et al., ibid., p. 344–347).

For ferroelectric (chiral, smectic) liquid-crystal mixtures, the condition that the pitch of the helix must be large, i.e. greater than 5 μm, in the $S_c^*$ phase and must be very large, i.e. greater than 10 μm or infinite, in the N* phase must additionally be fulfilled.

The optical switching time $\tau[\mu s]$ of ferroelectric liquid-crystal systems, which should be as short as possible, depends on the rotation viscosity of the system $\gamma$[mPas], the spontaneous polarization $P_s$[nC/cm$^2$] and the electric field strength E[V/m], in accordance with the equation $$\tau \approx \frac{\gamma}{P_s \cdot E}$$

Since the field strength E is determined by the electrode separation in the electrooptical assembly and by the applied voltage, the ferroelectric display medium must have low viscosity and high spontaneous polarization in order that a short switching time is achieved.

Finally, besides thermal, chemical and photochemical stability, a small optical anisotropy $\Delta n$, preferably <0.13, and a small positive or, preferably, negative dielectric anisotropy $\Delta\epsilon$ are required. (S. T. Lagerwall et al., "Ferroelectric Liquid Crystals for Displays" SID Symposium, October Meeting 1985, San Diego, Calif. USA).

It is only possible to satisfy all these demands using mixtures comprising several components. The basis (or matrix) used here is preferably compounds which if possible themselves already have the desired phase sequence I→N→$S_A$→$S_c$. Further components of the mixture are often added to reduce the melting point and to broaden the $S_c$ and usually also the N phase, to induce optical activity, for pitch compensation and to match the optical and dielectric anisotropy; however, the rotation viscosity, for example, should if possible not be increased at the same time.

Some of these components and also certain mixtures are already known from the prior art. However, since the development, in particular of ferroelectric liquid-crystal mixtures, can in no way be regarded as complete, the manufacturers of display elements are interested in a very wide variety of mixtures. A further reason for this, amongst others, is that conclusions on the quality of the liquid-crystalline mixtures too can only be made by considering the interactions of the liquid-crystalline mixtures with the individual assemblies of the display elements or of the cells (for example the orientation layer).

It is known that certain derivatives of phenylpyrimidine, in particular 5-alkyl-2(4-alkoxyphenyl)pyrimidines, are capable of forming $S_c$, $S_A$ and N phases (D. Demus and H. Zaschke, "Flüssige Kristalle in Tabellen", [Liquid Crystals in Tables], VEB Deutscher Verlag für Grundstoff-industrie, Leipzig 1974, pp. 260–261) and, in addition, can be converted into ferroelectric liquid-crystal mixtures by addition of optically active dopes [L. M. Blinov et al., Sow. Phys. Usp. 27 (7), 492 (1984); L. A. Beresnew et al., Ferroelectrics, 59 [321]/1 (1984), presented at the 5th Conference of Soc. Countries on Liquid Crystals, Odessa, USSR, October 1983; DE-A-3,515,347, EP-A 0,206,228 and EP-A 0,225,195].

It is furthermore known that lower melting points and a broadening of the liquid-crystalline phases desired can be achieved by mixing several liquid-crystalline compounds [D. Demus et al., Mol. Cryst. Liq. Cryst. 25, 215 (1974), J. W. Goodby, Ferroelectrics 49, 275 (1983)], and that the melting-point depression is the more pronounced the more the mixture components also differ structurally. (J. S. Dave et al., J. Chem. Soc. 1955, 4305). It was thus to be presumed that particularly low mixture melting points, and thus low phase-transition points of the $S_c$ phase, are obtained when compounds are mixed which, on the one hand, are significantly different structurally, but, on the other hand, are sufficiently similar to be readily miscible.

DE-C 2,257,588 discloses a 5-butoxy-2(4-pentoxyphenyl)pyrimidine, but this only forms a nematic phase.

In DE 3,831,226.3, it has been found that, as the base component, compounds of the type 5-alkoxy-2(4-alkoxyphenyl)pyrimidines of the general formula (I)

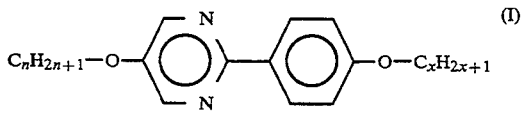

in which $C_nH_{2n+1}$ and $C_xH_{2x+1}$ are straight-chain alkyl radicals in which n is an integer from 6 to 14 and x is an integer from 2 to 14, are particularly highly suitable for liquid-crystalline mixtures, in particular ferroelectric liquid-crystalline mixtures; of them, at least two different compounds a' and a" are present in the mixture. For the most part, they exhibit the desired phase sequence I→N→$S_A$→$S_c$ with decreasing temperature. Compared with the known 5-alkyl-2-(4-alkoxyphenyl)pyrimidines, they have considerably broader $S_c$ phases and higher transition temperatures of the $S_c$→$S_A$ transition. In addition, the $S_c$ phase is even formed in the case of a lower number of carbon atoms in the alkyl(oxy) chains, for example even when $n=8$ and $x \not> 2$ or $n=6$ and $x \not> 6$. Compared with the known 5-alkyl-2-(4-alkoxyphenyl)-pyrimidines, this gives a greater choice of homologous, readily miscible compounds having $S_c$ phases for preparing the mixture. Due to their higher phase-transition temperatures $S_A$ to $S_c$ (for example 70° to 90° C.) and their broader $S_c$ phases, they also make it possible to prepare mixtures having very broad $S_c$ phases (for example up to a phase width of about 68°) and high transition temperatures $S_A/S_c$.

The mixtures of DE 3,831,226.3 of compounds of the formula (I) are already very highly suitable as a matrix for ferroelectric liquid-crystalline mixtures. However, they also have a large optical anisotropy ($\Delta n$) and a large positive dielectric anisotropy ($\Delta \epsilon$). In addition, the nematic phase, depending on the chain length n or x of the substituents, is still narrow.

By adding at least one compound (cyclohexanecarboxylate) of the general formula (II), i.e. a compound of type b,

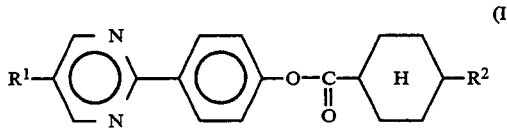
(II)

the parameters [$\Delta n$] and [$\Delta \epsilon$] can simultaneously be optimized and the width of the nematic phase can be matched to practical requirements.

In the general formula (II): $R^1$ is an alkyl chain having 10 to 16 carbon atoms or an alkoxy chain having 8 to 14 carbon atoms, and $R^2$ is an alkyl chain having 2 to 9 carbon atoms. These compounds are described in DE-A-3,731,639. They develop their favorable action even when added in amounts from about 2 mol %, relative to the mixture of the components of type a and b. When added in amounts from about 10 and up to about 40 mol %, the nematic phase is broadened by about 8° to 18° C. and the smectic phase by about 6° to 15° C. In addition, it is very advantageous that the addition only insignificantly increases the rotation viscosity of the base mixture according to the invention, which is already very low per se.

The melting point and the lower phase-transition temperature of the $S_c$ phase of the mixtures can be reduced, if they are still too high, by adding at least one compound (alkenyloxyphenylpyrimidine derivative) of the general formula (III), i.e. a compound of type c, to mixtures of compounds of type a alone or additionally containing compounds of type b:

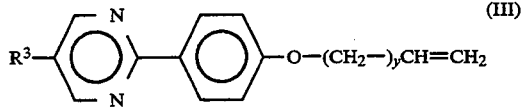
(III)

In the general formula (III), $R^3$ is a branched or straight-chain alkyl radical having 7 to 16 carbon atoms or a straight-chain or branched alkoxy radical having 6 to 14 carbon atoms, and y is an integer from 4 to 14. These compounds are described in DE-A-3,731,638. Added amounts of from about 10 to 35 mol %, relative to the overall mixture, reduce the lower temperature limit of the $S_c$ phase by up to 5° C. The other favorable physical properties of the mixtures are generally not impaired by this addition.

To reduce the melting point and the lower temperature limit of the $S_c$ phase, it is also possible to add, together with or in place of compounds of type c, compounds of the formula (IV), i.e. of type d,

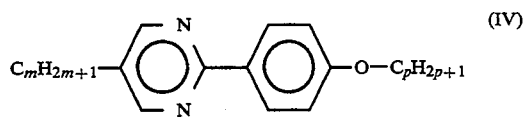
(IV)

where m and p, independently of one another, are integers from 6 to 14. When amounts of from about 10 to 25 mol % of the compound of type d or mixtures with compounds of type c, relative to the overall mixture, are added to mixtures of compounds of type a or a and b, the lower temperature limit of the $S_c$ phase is reduced by up to 10° C.

To further reduce the melting point and to improve the optical and dielectric anisotropy, and thus the contrast, in a display, the following carboxylates have furthermore been proposed as mixture components for a liquid-crystalline base mixture:

Carboxylates C of the general formula (V), (VI), (VII), (VIII) or (IX)

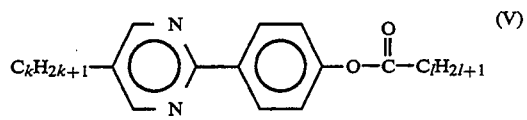
(V)

where
k may be an integer from 6 to 14, and
l may be an integer from 2 to 14,

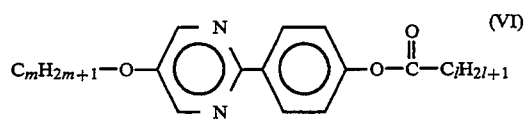
(VI)

where
m may be an integer from 5 to 14, and
l may be an integer from 2 to 14,

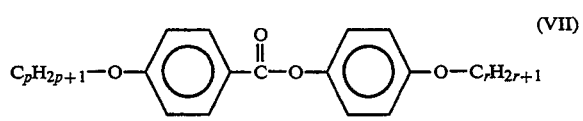
(VII)

where
p may be an integer from 7 to 14, and
r may be an integer from 4 to 14,

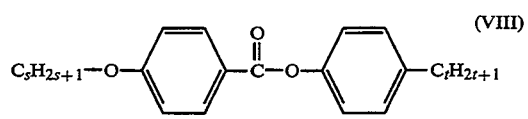
(VIII)

where
s may be an integer from 6 to 14, and
t may be an integer from 6 to 14,

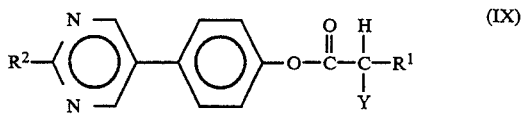

where
- R² is straight-chain or branched (C₁–C₁₂)alkyl or alkenyl, it being possible for one or two non-adjacent CH₂ groups to be replaced by O and/or S atoms,
- y is F, Cl, Br, CN or CF₃, and
- R¹ is branched (C₃–C₉)alkyl, benzyl or phenyl.

The object of the present invention is to develop novel ferroelectric LC mixtures which have high spontaneous polarization [$P_s$], low viscosity and good orientability in a display element by means of particularly suitable dopes in liquid-crystalline base mixtures.

The invention proceeds from base mixtures presented in DE 3,831,226 and in DE-A-3,909,356. However, the novel mixtures according to the invention additionally contain a chiral, optically active component D as dope, which results in a large pitch of the helix in the N* phase of the mixture and induces high spontaneous polarization ($P_s$) even in low concentration.

The addition of small amounts of dopes which result in high spontaneous polarization is therefore advantageous since the viscosity of the overall FLC mixture is not significantly increased.

The use of two dopes D which both have the same sign of spontaneous polarization, but have a different helix rotation sense, is particularly advantageous. On compensation of the pitch, this causes a synergistic effect in increasing the spontaneous polarization.

The invention thus also relates to dope combinations which have this synergistic effect in the base mixtures mentioned.

The novel invention thus relates to a ferroelectric liquid-crystalline mixture containing, as component A, at least two 5-alkoxy-2-(alkoxyphenyl)pyrimidines of the general formula (I)

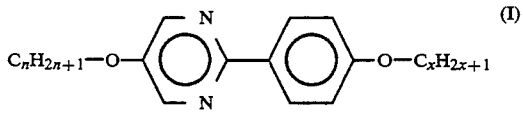

in which the alkyl radicals are straight-chain alkyl radicals in which n is an integer from 6 to 14 and x is an integer from 2 to 14, and, if appropriate, one or more cyclohexanecarboxylates of the general formula (II)

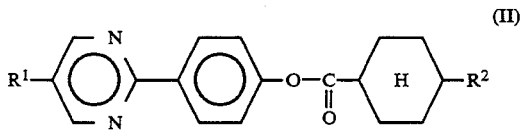

in which R¹ is an alkyl radical having 10 to 16 carbon atoms or an alkoxy radical having 8 to 14 carbon atoms, and R² is an alkyl radical having 2 to 9 carbon atoms, and, if appropriate, one or more alkenyloxphenylpyrimidine derivatives of the general formula (III)

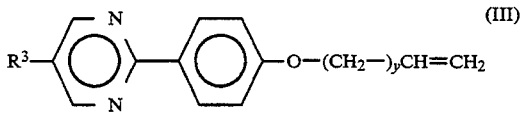

in which R³ is an alkyl chain having 7 to 16 carbon atoms or an alkoxy chain having 6 to 14 carbon atoms, and y is an integer from 4 to 14, and, if appropriate, one or more alkylpyrrimidinealkoxyphenyl derivatives of the general formula (IV)

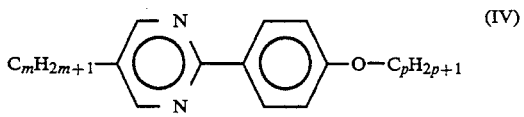

in which m and p, independently of one another, are integers from 6 to 14, and if appropriate as component B, an optically active compound from the group
a) optically active esters made from α-chlorocarboxylic acids and mesogenic phenols,
b) optically active esters of N-acylproline,
c) optically active esters of 1,3-dioxolane-4-carboxylic acids, and
d) optically active esters of oxirane-2-carboxylic acids, and if appropriate containing, as component C, one or more carboxylates of the general formula: (V), (VI), (VII), (VIII) or (IX)

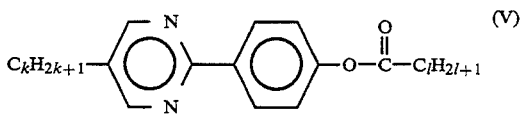

where
- k may be an integer from 6 to 14, and
- l may be an integer from 2 to 14,

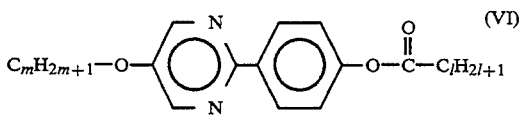

where
- m may be an integer from 5 to 14, and
- l may be an integer from 2 to 14,

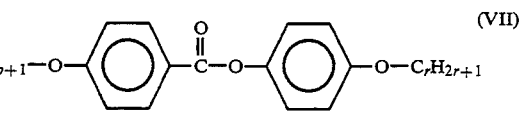

where
- p may be an integer from 7 to 14, and
- r may be an integer from 4 to 14,

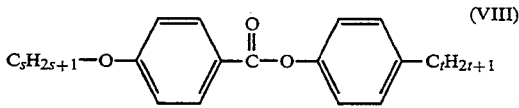

where s may be an integer from 6 to 14, and
t may be an integer from 6 to 14,

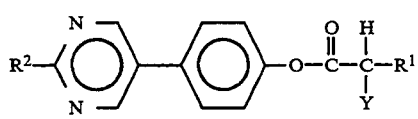 (IX)

where
R² is straight-chain or branched (C₁–C₁₂)alkyl or alkenyl, it being possible for one or two non-adjacent CH₂ groups to be replaced by O and/or S atoms,
y is F, Cl, Br, CN or CF₃ and
R¹ is branched (C₃–C₉)alkyl, benzyl or phenyl, wherein the ferroelectric liquid-crystal mixture furthermore contains an optically active component D which comprises one or more compounds from the following groups (X) and/or (XI) and/or (XII),
Group (X): optically active esters of tetrahydrofuran-2-carboxylic acid with mesogenic phenols
Group (XI): optically active aryl 2,3-epoxyalkyl ethers
Group (XII): optically active 1,3-dioxolan-4-yl ethers.

A preferred ferroelectric LC mixture is one which contains 0.5 to 30 mol-% of the optically active component D.

Another preferred mixture is one which contains two dopes from Groups D and B and in which the pitch of the helix induced in the nematic phase is approximately compensated at a given temperature.

A particularly preferred FLC mixture is one which contains, as component D, a chiral tetrahydrofuran-2 carboxylate (X) of the following general structure (Xa):

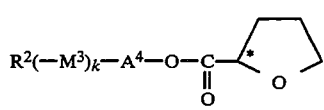 (Xa)

where
R² is a straight-chain or branched alkyl or alkenyl radical having 6 to 12 carbon atoms, which may contain an asymmetric carbon atom;
-M³ is —O—, —S—, —O—CO— or —CO—,
k is zero or 1,
-A⁴ is

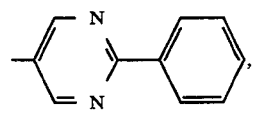,

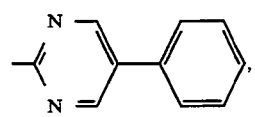,

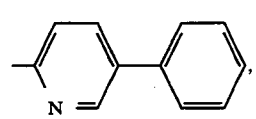,

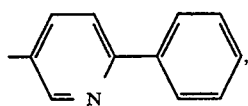,

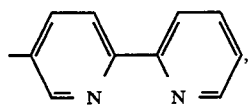,

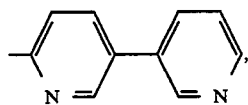,

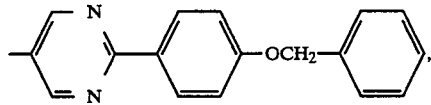,

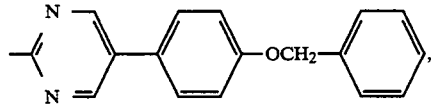,

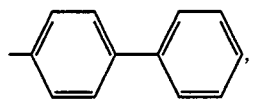,

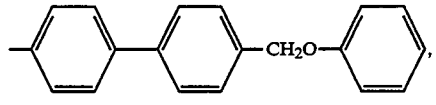,

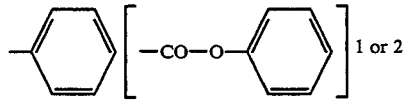,

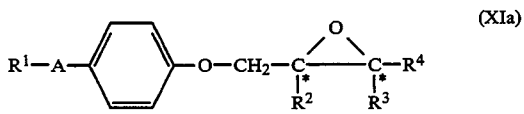

A further particularly preferred FLC mixture is one which contains, as component D, a chiral epoxyalkyl ether of the general structure (XIa)

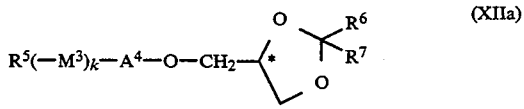 (XIa)

(aryl 2,3-epoxyalkyl ether)
R¹ is straight-chain or branched (C₁–C₁₂)alkyl, it being possible for one or two non-adjacent CH₂ groups to be replaced by O and/or S atoms,
A is diazine-2,5-diyl or diazine-3,6-diyl, and
R², R³ and R⁴, independently of one another, are H, straight-chain (C₁–C₁₀)alkyl or branched (C₃–C₁₀)alkyl, where R², R³ and R⁴ are not simultaneously H,
and an FLC mixture which contains, as component D, a chiral dioxolan-4-yl ether of the structure (XIIa)

$$R^5(-M^3)_k-A^4-O-CH_2-\overset{*}{\underset{}{}}\underset{O}{\overset{O}{\diagdown}}\underset{R^7}{\overset{R^6}{}}$$ (XIIa)

in which:

$R^6$ and $R^7$ are methyl or, together with the C(2) atom of the dioxolane ring, are a cyclohexane ring, $R^5$ is a straight-chain or branched alkyl or alkylene radical having 6 to 12 carbon atoms, which may contain an asymmetric carbon atom, -$M^3$ is —O—, —S— or —O—CO, k is zero or 1, and -$A^4$ is

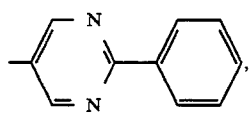

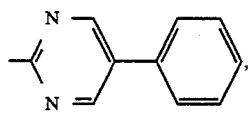

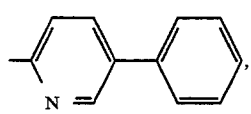

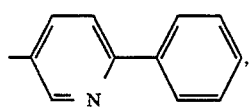

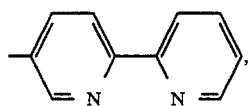

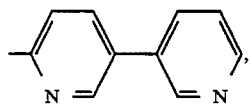

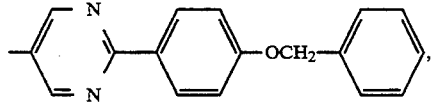

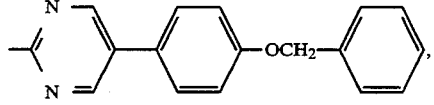

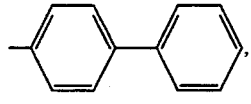

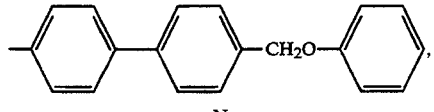

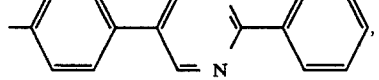

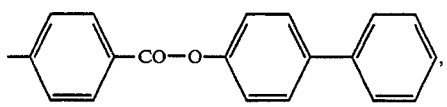

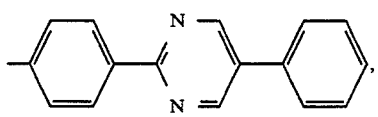

or

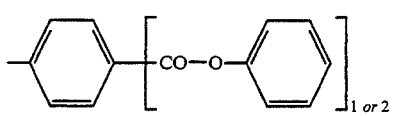

Very particularly preferred ferroelectric liquid-crystal mixtures are those which contain one or more compounds of type (Xb) and/or (XIb) and, a (XIIb) as component D:

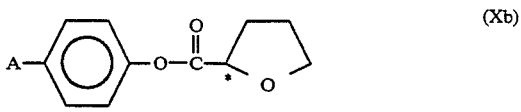 (Xb)

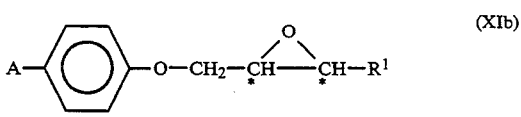 (XIb)

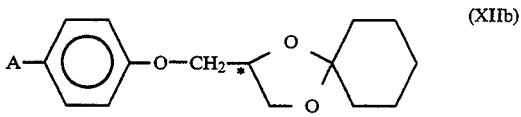 (XIIb)

where

A is pyrimidine-2,5-diyl, and $R^1$ is $C_1$–$C_{10}$-alkyl, it being possible for one or two non-adjacent $CH_2$ groups to be replaced by O.

The ferroelectric liquid-crystal mixtures according to the invention may advantageously be employed in electrooptical assemblies and display elements, in particular because they result in high contrast and a short switching time.

d₁) The optically active esters of tetrahydrofurancarboxylic acid (X) with an (R)-configuration induce a positive spontaneous polarization and a positive helix rotation sense in the mixtures according to the invention.

Optically active 1,3-dioxolane-4-carboxylates having an (R)-configuration are suitable for the compensation, since they induce a positive $P_s$ and such a large negative pitch that only 1 part by weight of the dioxolane derivative need be employed per 3 parts by weight of tetrahydrofurancarboxylic acid for compensation.

d₂) Likewise, optically active epoxyalkyl ethers (XI) may be employed for pitch compensation in combination with the tetrahydrofurancarboxylates (X), but in this case the two components must be employed in an approximately equal weight ratio.

e₁) Optically active aryl 2,3-epoxyalkyl ethers (XI) having a (2S,3S)-configuration induce in the mixtures according to the invention a positive spontaneous polarization and negative pitch, which can be compensated by adding optically active oxirane-2-carboxylates (as in DE-A-3,718,174) having a (2R,3R)-configuration. This class of substances is particularly suitable for pitch compensation, since only 1 part by weight of oxiranecarboxylate is generally required per 3 parts by weight of aryl 2,3-epoxyalkyl ether (XI).

f₁) Optically active ethers of 1,3-dioxolane derivatives having an R configuration induce a negative pitch in the mixtures according to the invention. They are therefore suitable for compensation of the mixtures containing optically active oxirane-2-carboxylates having a positive $P_s$ and a (2R,3R)-configuration. Due to the small pitch of the dioxolane ethers, relatively small amounts of this substance are required for pitch compensation. A weight ratio of these dopes of about 1:1 has proven successful for pitch compensation.

g) The optically active aryl 2,3-epoxyalkyl ethers having a (2S,3S)-configuration may also preferably be replaced for pitch compensation in the pitch-compensated dope combinations from Groups $e_1$ and $d_2$ by the compounds having a (2S,3R)-configuration. It is advantageous here that the compound having a (2S,3R)-configuration induces in the mixtures according to the invention a higher spontaneous polarization and such a small helix that only about half the amount of aryl 2,3-epoxyalkyl ethers having a (2S,3R)-configuration is necessary for pitch compensation compared with the combinations mentioned.

Thus, it has been found, surprisingly, that the level of about 10 mol-% of an optically active tetrahydrofuran-2-carboxylate (X) results in the mixtures of DE 3,831,226 and in DE-A-3,909,356 in a broadening of the melting point of up to 5° C. and induces a spontaneous polarization of up to +30 nC.cm-2.

The values for
the spontaneous polarization $P_s$ [nC/cm²],
the contrast K,
the optical switching time $\tau$[μs],
the pitch of the helix in the N* phase [μm],
the dielectric anisotropy $\Delta\epsilon$
and the optical anisotropy $\Delta n$ are determined for the ready-to-use ferroelectric liquid-crystal mixtures (all measurements at a temperature of 25° C.).

The $P_s$ values are measured by the method of H. Diamant et al. (Rev. Sci. Instr., 28, 30, 1957), where measurement cells with an electrode separation of 2 μm and ground polyimide as the orientation layer are used.

To determine $\tau$ and K, the measurement cell is clamped between crossed analyzer and polarizer on the rotary stage of a polarizing microscope.

To determine the contrast [K], the measurement cell is positioned, by rotation, so that a photodiode indicates minimum light transmission (dark state).

The microscope illumination is adjusted so that the photodiode indicates the same light intensity for all cells.

After a switching operation, the light intensity changes (bright state), and the contrast is calculated from the ratio of the light intensities in these states.

The switching time $\tau$ is determined using a photodiode by measuring the time taken for the light signal to increase from a signal height of 10 to 90%. The switching voltage comprises-rectangular pulses and is ±10 V/μm.

The N* pitch is determined in wedge-shaped cells by the method of Grandjean-Cano [F. Grandjean, CR Acad. Sci. (Paris) 172, 71 (1921); R. Cano, Bull. Soc. Franc. Mineral. Crystallogr. XC, 333 (1967)].

The phase-transition temperatures are determined using a polarizing microscope from the texture changes on heating. By contrast, the melting point is determined using a DSC instrument. The phase-transition temperatures between the phases

| Nematic | (N or N*) |
|---|---|
| Smectic-C | ($S_c$ or $S_c$*) |
| Smectic-A | ($S_A$ or $S_A$*) |
| Crystalline | (X) | are given in °C., and the values are between the phase symbols in the phase sequence.

EXAMPLE 1 a) A ferroelectric liquid-crystalline mixture

| | |
|---|---|
| 5-octoxy-2-(4-butoxyphenyl)pyrimidine | 24 mol % |
| 5-octoxy-2-(4-hexoxyphenyl)pyrimidine | 22.8 mol % |
| 5-octoxy-2-(4-octoxyphenyl)pyrimidine | 10.5 mol % |
| 5-octoxy-2-(4-decoxyphenyl)pyrimidine | 19.2 mol % |
| [4-(5-decylpyrimidin-2-yl)]phenyl trans-4-pentylcyclohexanecarboxylate | 13.5 mol % |
| 4-(5-n-octylpyrimidin-2-yl)phenyl (R)-tetrahydrofuran-2-carboxylate (dope d) | 10 mol % | exhibits the following liquid-crystalline phase ranges:

X7$S_c$*65.8$S_A$*76.5N*92I and has, at 25° C., a spontaneous polarization of 23 nC.cm−2, a contrast of 7 and a switching time of 40 μs. The pitch of this mixture is +3.9 μm at a temperature of 90° C.

b) In comparison to this, the liquid-crystalline mixture claimed in DE 3,831,226.3, which differs from the abovementioned ferroelectric mixture only in that it contains no dope, has the following phase ranges X9$S_c$84$S_A$93N105I By comparison, the ferroelectric mixture has a melting point which is lower by 2° C. EXAMPLE 2 a) A ferroelectric liquid-crystalline mixture comprising 6 components

| | |
|---|---|
| 5-octoxy-2-(4-butoxyphenyl)pyrimidine | 24 mol % |
| 5-octoxy-2-(4-hexoxyphenyl)pyrimidine | 22.8 mol % |
| 5-octoxy-2-(4-octoxyphenyl)pyrimidine | 10.5 mol % |
| 5-octoxy-2-(4-decoxyphenyl)pyrimidine | 19.2 mol % |
| [4-(5-decylpyrimidin-2-yl)]phenyl trans-4-pentylcyclohexanecarboxylate | 13.5 mol % |
| (2S,3S)-2-[4-(5-octylpyrimidin-2-yl)-phenyl]methyl-3-butyloxirane (dope e) | 10 mol % | exhibits the following liquid-crystalline phase ranges:

X6$S_c$*81.4$S_A$*88.7N*101I and has, at 25° C., a spontaneous polarization of +17 nC.cm−2, a contrast of 8 and a switching time of 30 μs.

The pitch of this mixture is −5.5 μm at a temperature of 90° C.

b) In comparison to this, the liquid-crystalline mixture claimed in DE 3,831,226.3, which differs from the abovementioned ferroelectric mixture only in that it contains no dope, has the following phase ranges $X9S_c84S_A93N105I$ By comparison, the ferroelectric mixture has a melting point which is lower by 3° C.

EXAMPLE 3 a) A ferroelectric liquid-crystalline mixture comprising 6 components

| | |
|---|---|
| 5-octoxy-2-(4-butoxyphenyl)pyrimidine | 24 mol % |
| 5-octoxy-2-(4-hexoxyphenyl)pyrimidine | 22.8 mol % |
| 5-octoxy-2-(4-octoxyphenyl)pyrimidine | 10.5 mol % |
| 5-octoxy-2-(4-decoxyphenyl)pyrimidine | 19.2 mol % |
| [4-(5-decylpyrimidin-2-yl)]phenyl trans-4-pentylcyclohexanecarboxylate | 13.5 mol % |
| (2S,3R)-2-[4-(5-octylpyrimidin-2-yl)-phenoxy]methyl-3-propyloxirane (dope e) | 10 mol % | exhibits the following liquid-crystalline phase ranges:

$X7S_c*67S_A*83.6N*96I$ and has, at 25° C., a spontaneous polarization of +22 nC.cm$^{-2}$, a contrast of 8 and a switching time of 25 μs. The pitch of this mixture is −2.6 μm at a temperature of 90° C.

b) In comparison to this, the liquid-crystalline mixture claimed in DE 3,831,226.3, which differs from the abovementioned ferroelectric mixture only in that it contains no dope, has the following phase ranges $X9S_c84S_A93N105I$ By comparison, the ferroelectric mixture has a melting point which is lower by 2° C.

EXAMPLE 4 a) A ferroelectric liquid-crystalline mixture comprising 6 components

| | |
|---|---|
| 5-octoxy-2-(4-butoxyphenyl)pyrimidine | 24 mol % |
| 5-octoxy-2-(4-hexoxyphenyl)pyrimidine | 22.8 mol % |
| 5-octoxy-2-(4-octoxyphenyl)pyrimidine | 10.5 mol % |
| 5-octoxy-2-(4-decoxyphenyl)pyrimidine | 19.2 mol % |
| [4-(5-decylpyrimidin-2-yl)]phenyl trans-4-pentylcyclohexanecarboxylate | 13.5 mol % |
| (S)-4-(2-octoxypyrimidin-5-yl)phenyl [spiro(1,3-dioxolane-2,1'-cyclohexane)-4-yl]methyl ether (dope f) | 5 mol % | exhibits the following liquid-crystalline phase ranges:

$X7S_c*81S_A*92N*102I$ and has, at 25° C., a spontaneous polarization of −0.1 nC.cm$^{-2}$, a contrast of 7 and a switching time of 2.3 ms. The pitch of this mixture is −25 μm at a temperature of 93° C.

b) In comparison to this, the liquid-crystalline mixture claimed in DE 3,831,226.3, which differs from the abovementioned ferroelectric mixture only in that it contains no dope, has the following phase ranges $X9S_c84S_A93N105I$ By comparison, the ferroelectric mixture has a melting point which is lower by 2° C.

EXAMPLE 5 a) A ferroelectric mixture comprising 7 components

| | |
|---|---|
| Mixture from Example 1b) | 90 mol % |
| (2S,3S)-2-[4-(5-octylpyrimidin-2-yl)-phenoxy]methyl-3-butyloxirane | 7.7 mol % |
| 4-(2-octoxypyrimidin-5-yl)phenyl (2R,3R)-3-propyloxirane-2-carboxylate (dope combination e$_1$) | 2.3 mol % | has the following liquid-crystalline phase ranges:

$X4.5S_c*80.5S_A*88N*100.5I$

At 25° C. this mixture has a spontaneous polarization of 18 nC.cm$^{-2}$, a contrast of 9 and, at a field strength of 10 V.μm$^{-1}$, a switching time of 45 μs. This mixture has the particular advantage that the pitch is compensated over the entire temperature range of the nematic phase.

| Pitch [μm] | >30 | >30 | >30 |
|---|---|---|---|
| Temperature [°C.] | 90 | 95 | 99 |

In addition, this ferroelectric mixture has the advantage that the melting point is 4.5° C. lower than in mixture 1b.

EXAMPLE 6 a) A ferroelectric liquid-crystalline mixture comprising the 9 components

| | |
|---|---|
| 5-octoxy-2-(4-hexoxyphenyl)pyrimidine | 18 mol % |
| 5-octoxy-2-(4-octoxyphenyl)pyrimidine | 7 mol % |
| 5-octoxy-2-(4-butoxyphenyl)pyrimidine | 17 mol % |
| 5-octoxy-2-(4-decoxyphenyl)pyrimidine | 9 mol % |
| 5-octoxy-2-(4-dodecoxyphenyl)pyrimidine | 9 mol % |
| 5-octyl-2-(4-dodecoxyphenyl)pyrimidine | 14.5 mol % |
| [4-(5-decylpyrimidin-2-yl)]phenyl trans-4-pentylcyclohexanecarboxylate | 21.5 mol % |
| (S)-4-(2-octoxypyrimidin-5-yl)phenyl [spiro(1,3-dioxolane-2,1'-cyclohexane)-4-yl]methyl ether | 1.6 mol % |
| 4-(2-octoxypyrimidin-5-yl)phenyl (2R,3R)-3-propyloxirane-2-carboxylate (dope combination f$_1$) | 2.4 mol % | exhibits the following liquid-crystalline phase ranges:

$X-3S_c*79S_A*86N*100.5I$ and has, at 25° C., a spontaneous polarization of +8.6 nC.cm$^{-2}$, a contrast of 8 and a switching time of 125 μs. The pitch of this mixture is 60 μm at a temperature of 90° C.

b) In comparison to this, the liquid-crystalline mixture claimed in DE 3,831,226.3, which differs from the abovementioned ferroelectric mixture only in that it contains no dope, has the following phase ranges $X-2S_c81S_A86N104I$

EXAMPLE 7

A ferroelectric mixture comprising the components

| | |
|---|---|
| Mixture from Example 1b) | 90 mol % |
| (R)-[2-(4'-dodecoxyphenyl)pyrimidin-5-yl] 2,2-dimethyl-1,3-dioxolane-4-carboxylate | 6.07 mol % |
| 4-(2-n-octoxypyrimidin-5-yl)phenyl (R)-tetrahydrofuran-2-carboxylate (dope combination d$_1$) | 3.93 mol % | has the following liquid-crystalline phase ranges

X 7.4 S$_C$* 81 S$_A$* 86 N* 100 I

At 25° C., this mixture has a spontaneous polarization of 18 nC.cm$^{-2}$ and, in a switching field of 10 V.μm$^{-1}$, a switching time of 51 μs. The contrast of the measurement cell is 9. The melting point of this mixture is 1.5° C. below that of the mixture from Example 1b. The pitch of this mixture is greater than 40 μm at 90° C.

EXAMPLE 8

A ferroelectric mixture comprising the components

| | |
|---|---|
| Mixture from Example 1b) | 90 mol % |
| 4-(2-n-octoxypyrimidin-5-yl)phenyl (R)-tetrahydrofuran-2-carboxylate | 5.93 mol % |
| (2S,3R)-2-(4-(5-octylpyrimidin-2-yl)-phenoxy]methyl-3-butyloxirane dope combination | 3.38 mol % | has the following liquid-crystalline phase ranges

X 5 S$_C$* 72.5 S$_A$* 87 N* 98 I

At 25° C. this mixture has a spontaneous polarization of 23 nC.cm$^{-2}$ and, at a field strength of 10 V.μm$^{-1}$ a switching time of 42 μs. The melting point of this mixture is 4° C. below that of the mixture from Example 1b). The pitch of this mixture is greater than 21 μm at 90° C.

EXAMPLE 9

A ferroelectric mixture comprising the components

| | |
|---|---|
| Liquid-crystalline mixture from Example 1b) | 94.3 mol % |
| 4-(2-octoxypyrimidin-5-yl)phenyl (2R,3R)-4-propyloxirane-2-carboxylate | 2.3 mol % |
| (2S,3R)-2-[4-(5-octylpyrimidin-2-yl)phenoxy]-methyl-3-butyloxirane (dope combination g) | 3.4 mol % | exhibits the following liquid-crystalline phase ranges:

X 7 S$_C$* 70 S$_A$* 85 N* 99 I

At 25° C., this mixture has a spontaneous polarization of 19 nC cm$^{-2}$ and, at a field strength of 10 V.μm$^{-1}$, a switching time of 32 μs. The melting point of this mixture is 4° C. below the melting point of the mixture from Example 1b). The pitch of this mixture is greater than 50 μm at 90° C.

Compared with the mixture from Example 5, this mixture has a switching time which is shorter by 13 μs and has a higher spontaneous polarization at a lower overall dope concentration.

These results confirm the advantages of the use of oxirane ethers having a (2S,3R) configuration compared with oxirane ethers having a (2R,3R) configuration.

EXAMPLE 10 a) A ferroelectric mixture comprising the components

| | |
|---|---|
| 5-octyl-2-(4-heptonoyloxyphenyl)-pyrimidine | 17.6 mol % |
| 5-octoxy-2-(4-exoxyphenyl)pyrimidine | 11.8 mol % |
| 5-octyloxy-2-(4-octoxyphenyl)pyrimidine | 4 mol % |
| 5-octoxy-2-(4-butoxyphenyl)pyrimidine | 13 mol % |
| 5-octoxy-2-(4-decoxyphenyl)pyrimidine | 7 mol % |
| 5-octoxy-2-(4-dodecoxyphenyl)pyrimidine | 7 mol % |
| 5-octyl-2-(4-dodecoxyphenyl)pyrimidine | 10.5 mol % |
| [4-(5-decylpyrimidin-2-yl)]phenyl trans-4-pentylcyclohexanecarboxylate | 16.7 mol % |
| (S)-4-(2-octoxypyrimidin-5-yl)phenyl [spiro(1,3-dioxolane-2,1'-cyclohexane)-4-yl]methyl ether | 5.4 mol % |
| 4-(2-octoxypyrimidin-5-yl)phenyl (2R,3R)-3-propyloxirane-2-carboxylate (dope combination f$_1$) | 6.6 mol % | exhibits the following liquid-crystalline phase ranges:

X − 8 S$_C$* 65 S$_A$* 74 N* 86 I and has, at a temperature of 25° C., a spontaneous polarization of 30 nC.cm$^{-2}$ and a switching time of 41 μs.

This mixture has the advantage that the pitch is compensated over the entire temperature range of the nematic phase.

| Pitch [μm] | 20 | 35 | >100 |
|---|---|---|---|
| Temperature [°C.] | 75 | 76 | 77–80 | b) In comparison to this, a liquid-crystalline mixture which differs from the abovementioned ferroelectric mixture only in that it contains no dope has the following phase ranges

X − 5 S$_C$ 71 S$_A$ 78 N 94 I

The dopes also have the advantage that they lower the melting point.

EXAMPLE 11 a) A ferroelectric mixture comprising the following components

| | |
|---|---|
| Mixture from Example 6b) | 76.5 mol % |
| (2S,3S)-2-(4-(5-octylpyrimidin-2-yl)-phenoxy]methyl-3-butyloxirane | 18 mol % |
| 4-(2-octoxypyrimidin-5-yl)phenyl (2R,3R)-3-propyloxirane-2-carboxylate (dope combination e$_1$) | 5.5 mol % | has the following liquid-crystalline phase ranges:

X − 1 S$_C$* 65 S$_A$* 68 N* 83 I

At a temperature of 25° C., this mixture has a spontaneous polarization of 50 nC.cm$^{-2}$ and, at a field strength of 10 V.μm$^{-1}$, a switching time of 50 μs. This mixture has the particular advantage that the pitch is compensated over the entire temperature range of the nematic phase.

| Pitch [μm] | >60 | >24 | >14 |
|---|---|---|---|
| Temperature [°C.] | 69 | 74 | 79 |

EXAMPLE 12 a) A ferroelectric mixture comprising 9 components

| | |
|---|---|
| Mixture from Example 6b) | 96.2 mol % |
| (2S,3S)-2-[4-(5-octylpyrimidin-2-yl)-phenoxy]methyl-3-butyloxirane | 2.9 mol % |
| 4-(2-octoxypyrimidin-5-yl)phenyl (2R,3R)-3-propyloxirane-2-carboxylate (dope combination e₁) | 0.9 mol % | has the following liquid-crystalline phase ranges:

X1S$_c$*66S$_A$*74N*90I

At 25° C. this mixture has a spontaneous polarization of 5.8 nC cm$^{-2}$ and, at a field strength of 10 V μm$^{-1}$, a switching time of 114 μs. The pitch in the nematic phase is >30 μm at a temperature of 80° C.

EXAMPLE 13 a) A ferroelectric mixture comprising the components

| | |
|---|---|
| Mixture from Example 10b) | 95.65 mol % |
| (2S,3S)-2-[4-(5-octylpyrimidin-2-yl)-phenoxy]methyl-3-propyloxirane | 2.8 mol % |
| 4-(2-octoxypyrimidin-5-yl)phenyl (2R,3R)-3-propyloxirane-2-carboxylate (dope combination e₁) | 1.55 mol % | has the following liquid-crystalline phase ranges:

X−4S$_c$*67S$_A$*75N*91I

At 25° C. this mixture has a spontaneous polarization of 10.3 nC.cm$^{-2}$, and, at a field strength of 10 V.μm$^{-1}$, a switching time of 76 μs. The pitch of this mixture is greater than 10 μm at a temperature of 80° C.

EXAMPLE 14 a) A ferroelectric mixture comprising the 9 components

| | |
|---|---|
| 5-octoxy-2-(4-hexoxyphenyl)pyrimidine | 10.3 mol % |
| 5-octoxy-2-(4-octoxyphenyl)pyrimidine | 3.5 mol % |
| 5-octoxy-2-(4-butoxyphenyl)pyrimidine | 11.5 mol % |
| 5-octoxy-2-(4-decoxyphenyl)pyrimidine | 6.3 mol % |
| 5-octyl-2-(4-dodecoxyphenyl)pyrimidine | 9.2 mol % |
| [4-(5-decylpyrimidin-2-yl)]phenyl trans-4-pentylcyclohexanecarboxylate | 14.8 mol % |
| [4-(5-dodecylpyrimidin-2-yl)]phenyl trans-4-pentylcyclohexanecarboxylate | 7.9 mol % |
| 5-octyl-2-(4-heptonoyloxyphenyl)pyrimidine | 15.5 mol % |
| 4-(2-(4-butyldimethylsilylbutoxy-pyrimidin-5-yl)phenyl (2R,3R)-3-hexyloxirane-2-carboxylate | 3 mol % |
| (2S,3S)-3-butyloxirane-2-methyl 2-(4-(4-butyldimethylsilylbutoxy)-phenyl)pyrimidin-5-yl ether (dope combination e₁) | 18 mol % | exhibits the following liquid-crystalline phase ranges:

X−11S$_c$*71S$_A$*75N*86I and has, at a temperature of 25° C., a spontaneous polarization of 47 nC.cm$^{-2}$ and a switching time of 80 μs. The pitch of this mixture is 8 μm at a temperature of 78° C.

b) In comparison to this, a liquid-crystalline mixture which differs from the abovementioned ferroelectric mixture only in that it contains no dope has the following phase ranges X−2S$_c$75.2N100I The dopes thus have the advantage that they additionally lower the melting point.

We claim:

1. A ferroelectric liquid-crystalline mixture containing, as component A, at least two 5-alkoxy-2-(alkoxyphenyl)pyrimidines of the general formula (I)

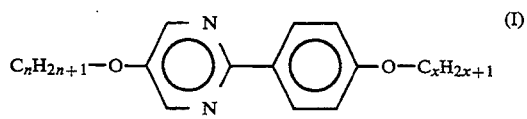

in which the alkyl radicals are straight-chain alkyl radicals in which n is an integer from 6 to 14 and x is an integer from 2 to 14, and, optionally, one or more cyclohexanecarboxylates of the general formula (II)

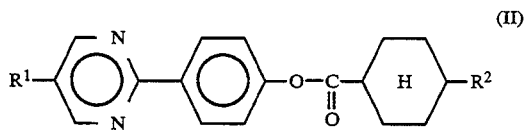

in which R$^1$ is an alkyl radical having 10 to 16 carbon atoms or an alkoxy radical having 8 to 14 carbon atoms, and R$^2$ is an alkyl radical having 2 to 9 carbon atoms, and, optionally, one or more alkenyloxyphenylpyrimidine derivatives of the general formula (III)

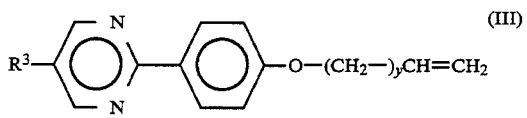

in which R$^3$ is an alkyl chain having 7 to 16 carbon atoms or an alkoxy chain having 6 to 14 carbon atoms, and y is an integer from 4 to 14, and, optionally, one or more alkylpyrimidinealkoxyphenyl derivatives of the general formula (IV)

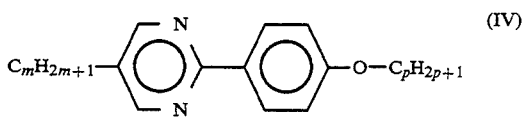

in which m and p, independently of one another, are integers from 6 to 14, and as component B, an optically active compound from the group
  a) optically active esters of 1,3-dioxolane-4-carboxylic acids, and
  b) optically active esters of oxirane-2-carboxylic acids,
and optionally containing, as component C, one or more carboxylates of the general formula: (V), (VI), (VII), (VIII) or (IX):

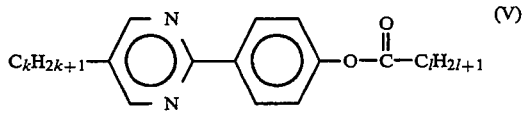

where
k may be an integer from 6 to 14, and
l may be an integer from 2 to 14,

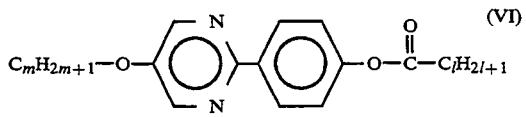

where
m may be an integer from 5 to 14, and
l may be an integer from 2 to 14,

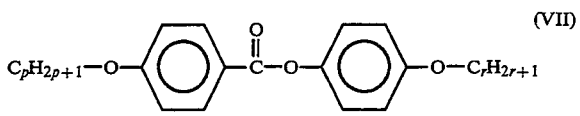

where
p may be an integer from 7 to 14, and
r may be an integer from 4 to 14,

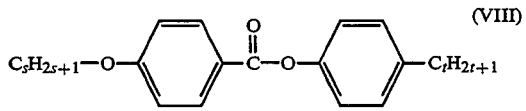

where
s may be an integer from 6 to 14, and
t may be an integer from 6 to 14,

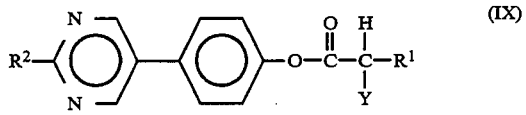

where
$R^2$ is straight-chain or branched ($C_1$-$C_{12}$)alkyl or alkenyl, it being possible for one or two non-adjacent $CH_2$ groups to be replaced by O and/or S atoms,
y is F, Cl, Br, CN or $CF_3$ and
$R^1$ is branched ($C_3$-$C_9$) alkyl, benzyl or phenyl, and an optically active component D which comprises one or more compounds from the following groups (X) and/or (XI) and/or (XII), Group (X): optically active esters of tetrahydrofuran-2-carboxylic acid with mesogenic phenols Group (XI): optically active aryl 2,3-epoxyalkyl ethers of mesogenic phenols Group (XII): optically active 1,3-dioxolan-4-yl ethers of mesogenic phenols, and in which the pitch of the helix (induced in the nematic phase) is greater than 10 μm or infinite.

2. A ferroelectric liquid-crystal mixture as claimed in claim 1, which contains 0.5 to 30 mol-% of the optically active component D.

3. A ferroelectric liquid-crystal mixture as claimed in claim 1, which contains two dopes from Groups D and B.

4. A ferroelectric liquid-crystal mixture as claimed in claim 1, which contains, as component D, a chiral tetrahydrofuran-2-carboxylate (X) of the following general structure (Xa):

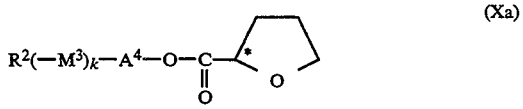

where
$R^2$ is a straight-chain or branched alkyl or alkenyl radical having 6 to 12 carbon atoms, which may contain an asymmetric carbon atom;
-$M^3$ is —O, —S, —O—CO or —CO,
K is zero or 1,
-$A^4$ is

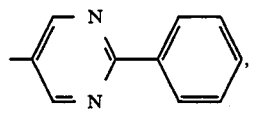

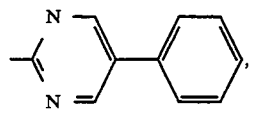

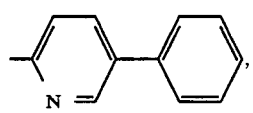

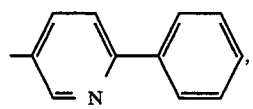

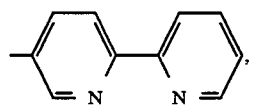

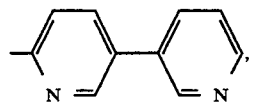

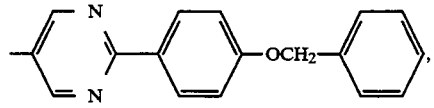

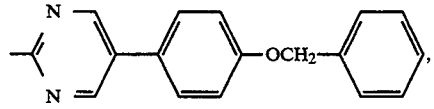

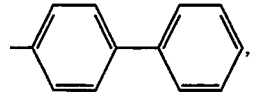

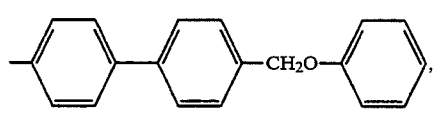

or

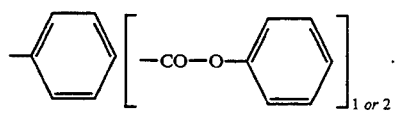

5. A ferroelectric liquid-crystal mixture as claimed in claim 1, which contains, as component D, a chiral epoxyalkyl ether of the general structure (XIa)

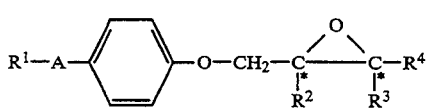

(aryl 2,3-epoxyalkyl ether)

$R^1$ is straight-chain or branched ($C_1$–$C_{12}$) alkyl, it being possible for one or two non-adjacent $CH_2$ groups to be replaced by O and/or S atoms, A is diazine-2,5-diyl or diazine-3,6-diyl, and $R^2$, $R^3$ and $R^4$ independently of one another, are H, straight-chain ($C_1$–$C_{10}$)alkyl or branched ($C_3$–$C_{10}$)alkyl, where $R^2$, $R^3$ and $R^4$ are not simultaneously H.

6. A ferroelectric liquid-crystal mixture as claimed in claim 1, which contains, as component D, a chiral dioxolan-4-yl ether of the structure (XIIa)

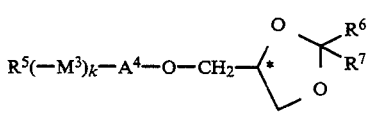

in which:

$R^6$ and $R^7$ are methyl or, together with the C(2) atom of the dioxolane ring, are a cyclohexane ring, $R^5$ is a straight-chain or branched alkyl or alkylene radical having 6 to 12 carbon atoms, which may contain an asymmetric carbon atom, -$M^3$ is —O—, —S— or —O—CO—, K is zero or 1, and -$A^4$ is

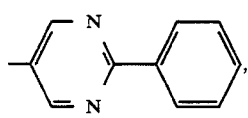

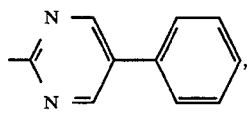

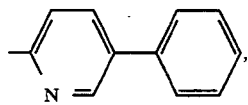

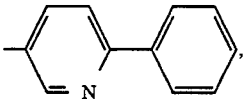

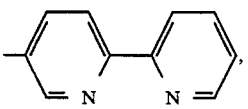

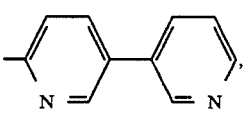

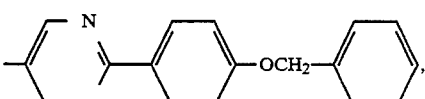

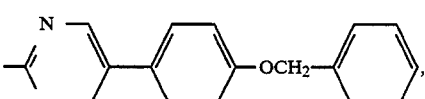

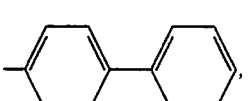

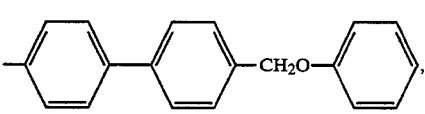

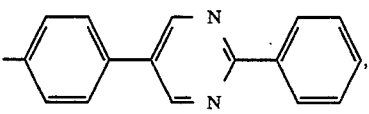

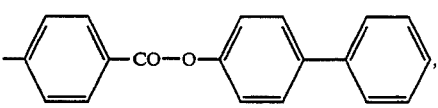

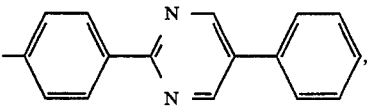

or

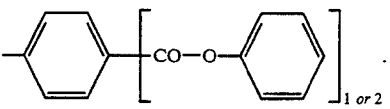

7. A ferroelectric liquid-crystal mixture as claimed in claim 1, which contains, as component D, one or more compounds of the structure (Xb), (XIb) and (XIIb):

(Xb)

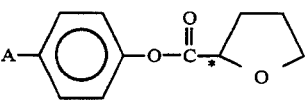

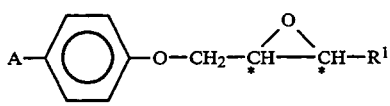 (XIB)

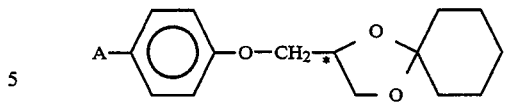 (XIIb)

where
A is pyrimidine-2,5-diyl, and
$R^1$ is $C_1$–$C_{10}$-alkyl, it being possible for one or two non-adjacent $CH_2$ groups to be replaced by O.

8. An electrooptical assembly containing a ferroelectric mixture as claimed in any one of claims 1 to 7.

9. A ferroelectric liquid-crystal mixture as claimed in claim 1, which contains, as component D, 4-(5-n-octyl-pyrimidin-2-yl)phenyl (R)-tetrahydrofuran-2-carboxylate.

* * * * *